L. E. LEATHERS.
RESILIENT WHEEL.
APPLICATION FILED APR. 29, 1919.

1,383,829.

Patented July 5, 1921.
2 SHEETS—SHEET 1.

Inventor
L. E. Leathers,
By
Attorney

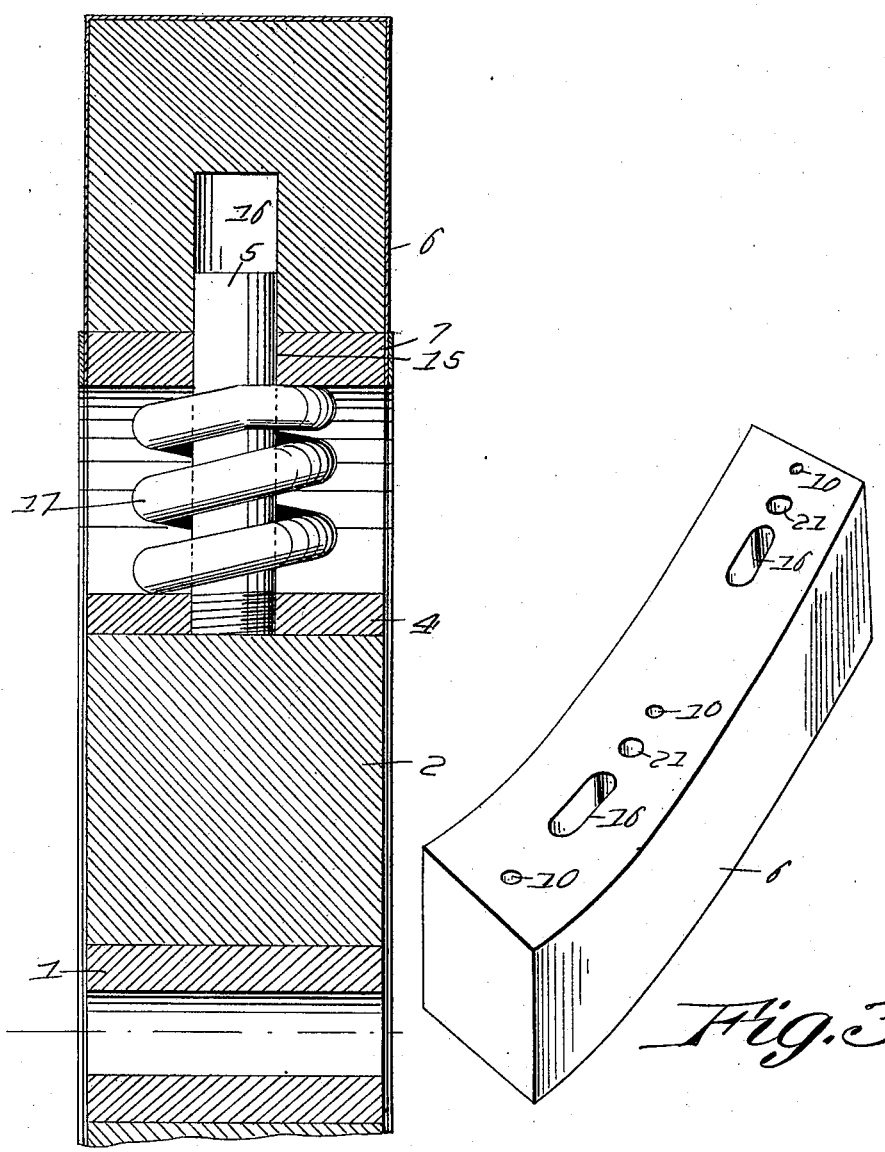

UNITED STATES PATENT OFFICE.

LOU EDGAR LEATHERS, OF WEED, CALIFORNIA.

RESILIENT WHEEL.

1,383,829.　　　　　Specification of Letters Patent.　　Patented July 5, 1921.

Application filed April 29, 1919. Serial No. 293,452.

*To all whom it may concern:*

Be it known that LOU E. LEATHERS, citizen of the United States, residing at Weed, in the county of Siskiyou and State of California, has invented new and useful Improvements in Resilient Wheels, of which the following is a specification.

The object of the invention is to provide a form of wheel which while adapted for general use, is particularly designed for heavy work such as that required in connection with trucks, drays and the like, to minimize the strain upon the wheel particularly in starting and stopping and more especially in connection with the driving or traction wheels and also to provide a wheel wherein a cushioning effect commensurate with the load which the vehicle is intended to carry to perform the function of pneumatic or cushioned tires ordinarily constructed of or including rubber or like resilient material to minimize the shocks and jars incident to traversing rough surfaces.

As illustrated and described a specific embodiment of the invention is adhered to but to this embodiment the invention is not to be restricted. The right is reserved to make such changes or alterations as the actual reduction to practice may suggest, in so far as such changes or alterations are compatible in spirit with the annexed claim.

In the accompanying drawings:

Fig. 2 is a section on the line 2—2 of Fig. 1.

Fig. 3 is a perspective view of one of the felly sections, looking at the inner face of said section.

Figure 1:
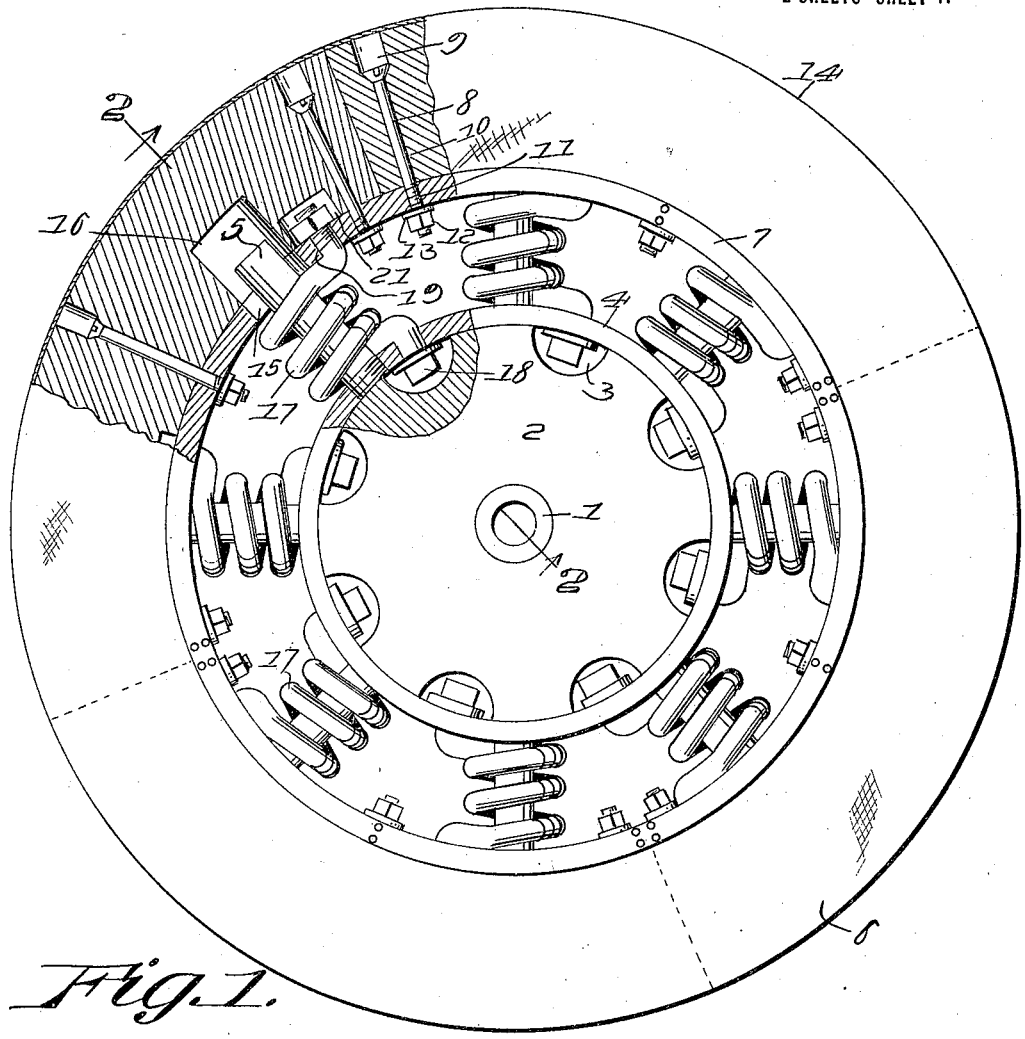
Figure 1 is a view partly in section and partly in elevation showing the improved wheel.
Figure 4:
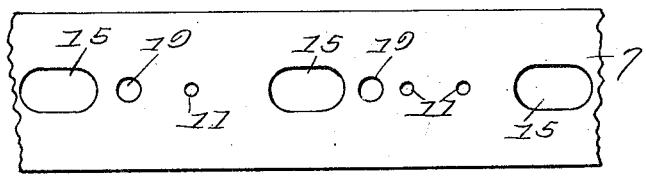
Fig. 4 is a plan view of the face of the ring supporting the felly sections.

Referring to the drawings, the invention is shown as comprising an inner hub member comprising the hub 1 and the disk 2 in the periphery of which there are formed at uniformly spaced angular distances the semicircular recesses 3. Surrounding the disk 2 on its periphery there is a ring or band 4 from which there radially project the spoke members 5, these latter being preferably of tubular construction and threadedly engaged in the ring 4.

The outer or felly member of the wheel comprises a plurality of arcuate tire sections 6 which are arranged in end to end contact around a ring or band 7, being secured to the latter by means of bolts 8 whose heads seat in counter-sunk portions 9 of holes 10 formed in the felly sections. These bolts likewise pass through holes 11 formed in the ring or band 7 and receive on their inner ends which are threaded the nuts and washers 12 and 13.

Oval holes 15 are formed in the ring or band 7 to register with blind oval shaped holes 16 formed in the felly sections 6. The width of these holes is equal to the diameter of the spokes 5. Thus no lateral movement of the ring 7 or felly sections 6 is possible with respect to the spokes but relative longitudinal movement of the rim member and spokes is possible and the ring 7 may be disposed in eccentric relation with the ring or band 4 of the inner member of the wheel.

In surrounding relation to the spokes there are heavy compression springs 17 each having one end turned and passed through a hole in the ring or band 4, receiving on the inner projecting end a nut 18, which stands in one of the recesses 3. The opposite ends of the springs are turned and passed through the holes 19 in the ring 7, receiving on their outer ends the nuts 20 which abut the outer periphery of the ring 7, these nuts standing in pockets 21 formed in the felly section 6 on the inner curved faces thereof.

In use, the weight supported by the wheel is received at the hub 1 and as this weight creates a pressure upon the wheel, the springs 17 which are below the wheel are caused to yield and the spokes 5 pass down farther than their normal distance into the felly sections, the holes 15 in the ring 7 and 16 in the felly sections permitting such movement in the spokes but preclude lateral movement of them and the hub section on the device with respect to the felly section. The elongations of the holes 16 and 17 by making them oval shaped provides for movement of the felly member in the direction of the circumference of the wheel.

From the foregoing description and the accompanying drawings, it is believed that a clear enough understanding of the invention is to be had to render further description unnecessary.

The invention having been described, what is claimed as new and useful is:

A resilient wheel having normally concentric hub and rim members, radial spokes secured at their inner ends to the hub member and fitted at their outer ends in openings in the rim member, said openings being extended longitudinal of the rim member to permit of the movement of the spoke relative thereto, and coiled springs respectively embracing said spokes and each spring being terminally secured rigidly to said hub and rim members for cushioning and yieldingly resisting the relative movements of the said hub and rim members in radial and circumferential directions in the plane of said members, In testimony whereof he affixes his signature.

LOU EDGAR LEATHERS.